US010510038B2

(12) United States Patent
Kumar et al.

(10) Patent No.: US 10,510,038 B2
(45) Date of Patent: Dec. 17, 2019

(54) COMPUTER IMPLEMENTED SYSTEM AND METHOD FOR RECOGNIZING AND COUNTING PRODUCTS WITHIN IMAGES

(71) Applicant: Tata Consultancy Services Limited, Mumbai (IN)

(72) Inventors: Swagat Kumar, Noida (IN); Nishant Kejriwal, Noida (IN); Sourav Garg, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 462 days.

(21) Appl. No.: 15/184,444

(22) Filed: Jun. 16, 2016

(65) Prior Publication Data

US 2016/0371634 A1 Dec. 22, 2016

(30) Foreign Application Priority Data

Jun. 17, 2015 (IN) .......................... 2322/MUM/2015

(51) Int. Cl.
 *G06Q 10/08* (2012.01)
(52) U.S. Cl.
 CPC .. *G06Q 10/087* (2013.01); *G06T 2207/30242* (2013.01); *G06T 2210/12* (2013.01)
(58) Field of Classification Search
 CPC .................. G06Q 10/087; G06T 7/11; G06T 2207/30242; G06T 2210/12; G06K 9/4671; G06K 9/6212
 See application file for complete search history.

(56) References Cited

U.S. PATENT DOCUMENTS

| 7,627,178 B2 | 12/2009 | Suzuki et al. |
| 7,660,468 B2 | 2/2010 | Gokturk et al. |
| 8,630,924 B2 * | 1/2014 | Groenevelt .......... G06Q 10/087 211/90.01 |
| 8,706,711 B2 | 4/2014 | Vaddadi et al. |

(Continued)

OTHER PUBLICATIONS

Winlock, T. et al., "Toward Real-Time Grocery Detection for the Visually Impaired", 2010 IEEE Computer Society Conference on Computer Vision and Pattern Recognition—Workshops, pp. 49-56, (2010).

*Primary Examiner* — Allen C Chein
*Assistant Examiner* — Denisse Y Ortiz Roman
(74) *Attorney, Agent, or Firm* — Finnegan, Henderson, Farabow, Garrett & Dunner LLP

(57) ABSTRACT

The system and method for recognizing and counting products within images is disclosed. The products are recognized by carrying out a nearest-neighbor search in the template feature space using a k-d tree and the product count is then obtained by using a maximum feature repeatability index for each identified feature. The system also obtains product arrangement by fitting bounding boxes around each identified product. The count of boxes thus obtained may also provide the exact number of discrete products visible in an image. A second stage of grid-based search is also carried out in the neighborhood of each detected product to detect new products that might have been missed out in the previous step. This detection is based on a confidence measure including information like histogram matching and spatial location of products. This system is also useful in verifying planogram compliance for a given product.

16 Claims, 15 Drawing Sheets

(56) References Cited

U.S. PATENT DOCUMENTS

| | | | |
|---|---|---|---|
| 9,064,161 B1* | 6/2015 | Boman | G06K 7/01 |
| 9,330,474 B1* | 5/2016 | Shekar | G06T 7/60 |
| 9,489,401 B1* | 11/2016 | Garcia | G06K 9/00671 |
| 9,665,800 B1* | 5/2017 | Kuffner, Jr. | G06T 15/50 |
| 9,996,818 B1* | 6/2018 | Ren | G06Q 10/087 |
| 10,007,688 B2* | 6/2018 | He | G06F 17/30495 |
| 10,007,964 B1* | 6/2018 | Calhoon | G06T 1/0021 |
| 2002/0044202 A1* | 4/2002 | Lee | H04N 13/239 348/42 |
| 2006/0020486 A1* | 1/2006 | Kurzweil | G06K 9/228 382/111 |
| 2008/0077511 A1* | 3/2008 | Zimmerman | G06Q 10/00 705/28 |
| 2009/0063307 A1* | 3/2009 | Groenovelt | G06Q 10/087 705/28 |
| 2011/0011936 A1* | 1/2011 | Morandi | G06K 9/00 235/454 |
| 2012/0127276 A1* | 5/2012 | Tsai | G06K 9/4671 348/47 |
| 2012/0263388 A1* | 10/2012 | Vaddadi | G06F 17/30247 382/225 |
| 2012/0323620 A1* | 12/2012 | Hofman | G06Q 10/06 705/7.11 |
| 2012/0330967 A1* | 12/2012 | Vaddadi | G06K 9/6228 707/743 |
| 2013/0051667 A1* | 2/2013 | Deng | G06K 9/00691 382/168 |
| 2013/0251197 A1* | 9/2013 | Liu | G06K 9/3241 382/103 |
| 2014/0079286 A1* | 3/2014 | Lee | G06K 9/6202 382/103 |
| 2014/0235267 A1* | 8/2014 | Song | G05D 1/0253 455/456.1 |
| 2014/0254942 A1* | 9/2014 | Liu | G06F 17/30247 382/209 |
| 2014/0270498 A1 | 9/2014 | Chester et al. | |
| 2015/0049902 A1* | 2/2015 | Moraleda | G06K 9/00624 382/103 |
| 2015/0049943 A1* | 2/2015 | Hamsici | G06K 9/4609 382/170 |
| 2015/0127430 A1* | 5/2015 | Hammer, III | G06Q 10/087 705/7.35 |
| 2015/0379366 A1* | 12/2015 | Nomura | G06Q 50/28 382/203 |
| 2016/0132220 A1* | 5/2016 | Chiu | G06Q 10/087 715/772 |
| 2017/0178310 A1* | 6/2017 | Gormish | G06K 9/52 |
| 2018/0025310 A1* | 1/2018 | Gabbai | G06Q 10/087 705/28 |

\* cited by examiner

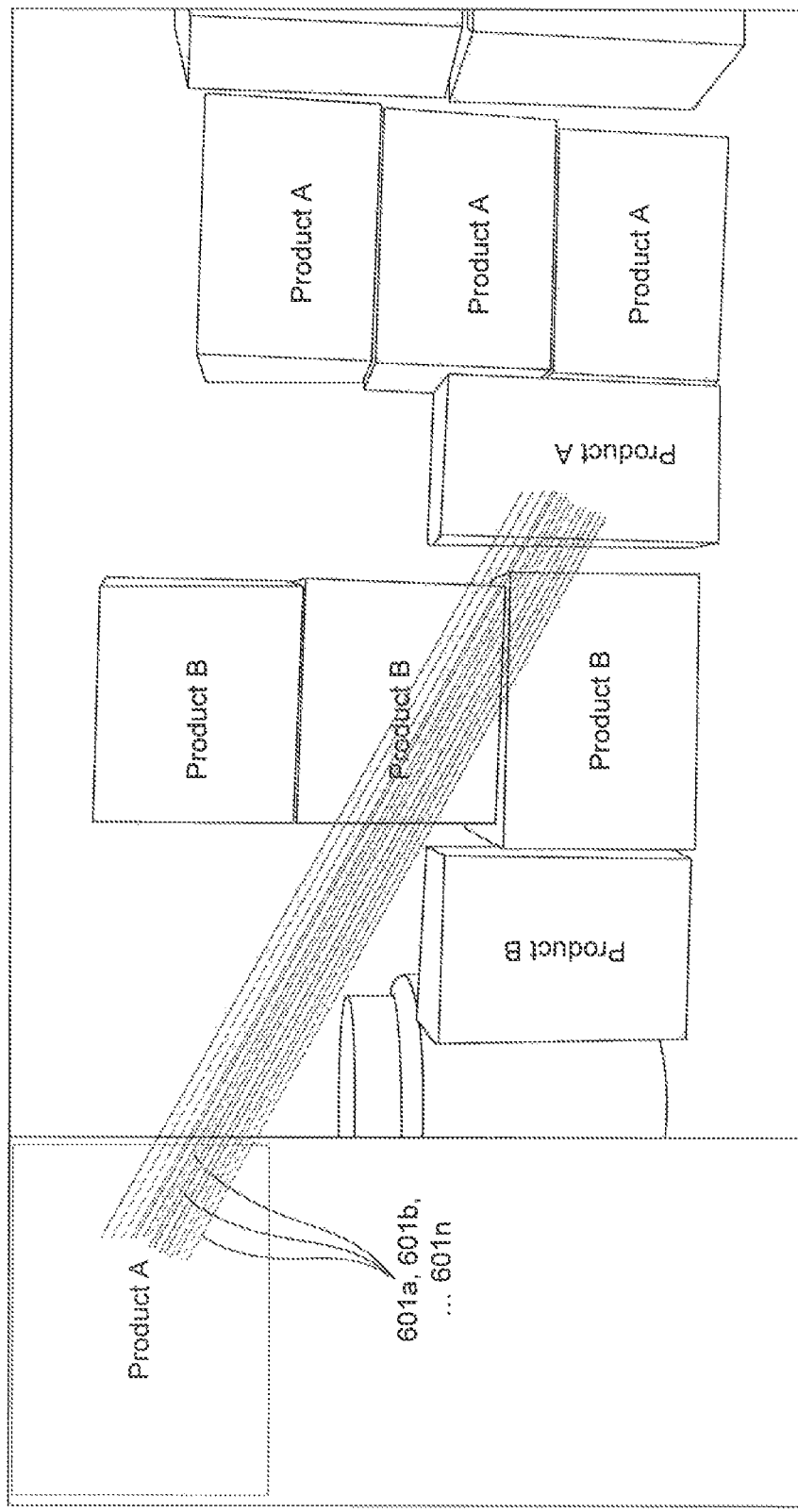

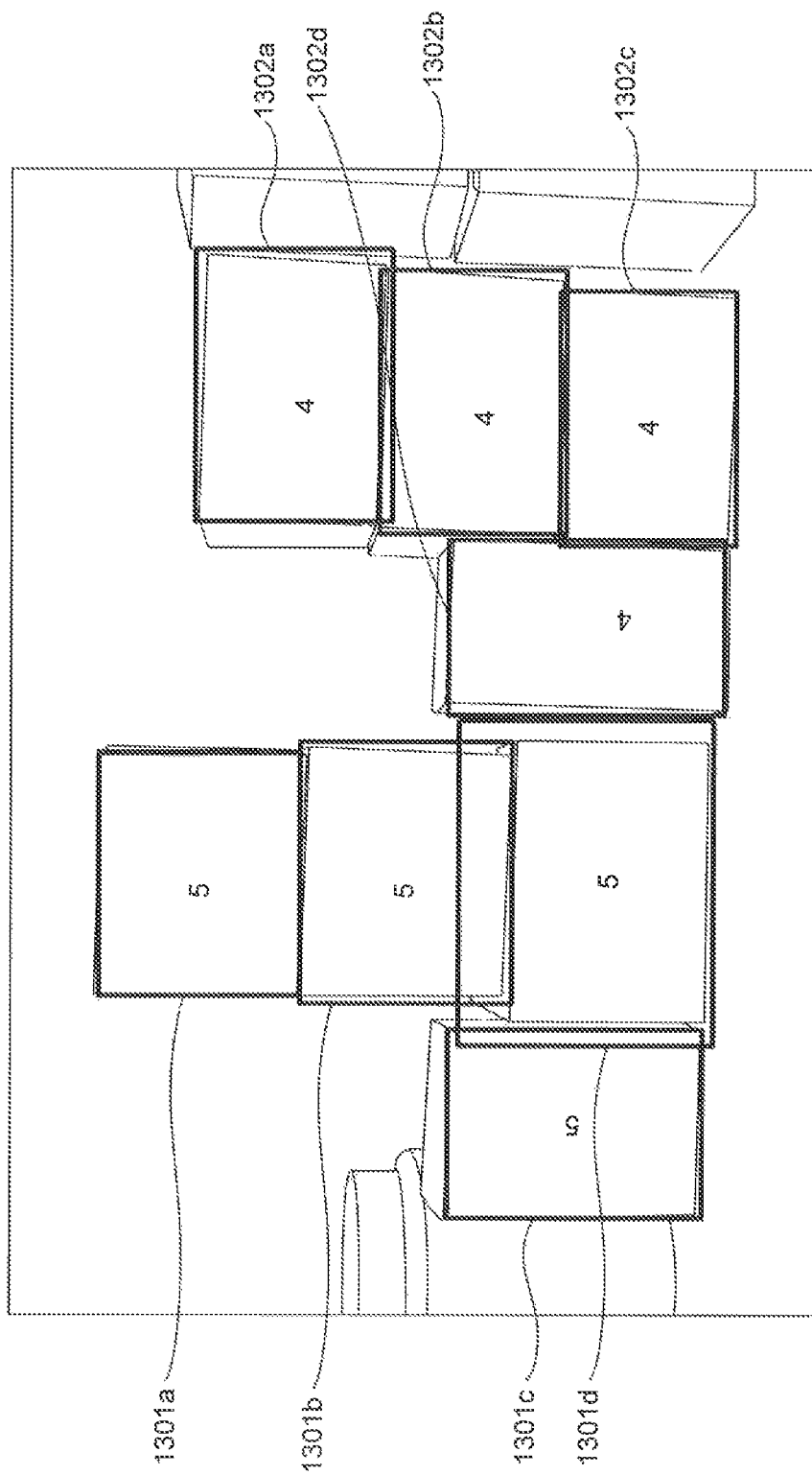

COMPUTER IMPLEMENTED SYSTEM AND METHOD FOR RECOGNIZING AND COUNTING PRODUCTS WITHIN IMAGES

PRIORITY CLAIM

This U.S. patent application claims priority under 35 U.S.C. § 119 to: India Application No. 2322/MUM/2015, filed on Jun. 17, 2015. The entire contents of the aforementioned application are incorporated herein by reference.

TECHNICAL FIELD

The present disclosure relates to the field of product recognition and product counting.

BACKGROUND

Challenges faced by the retail industry include frequent out-of-stock situations, product misplacement and organized retail crime including theft, which result in lower profit margins. Usually, certain checks are carried out by human attendants at pre-defined intervals in order to overcome these challenges. This requires considerable manpower which in turn increases cost. To avoid this situation, some stores use smart shelves having RFID antennae or weight sensors that can provide accurate information about the number of products available on the shelf. Some stores install an array of surveillance cameras which are judiciously mounted so as to monitor their shelves. However, processing surveillance camera images might pose a challenge due to the distance and viewing angle. The complexity of such systems also depends on the exact number of cameras used for the monitoring purpose. Moreover, all the above mentioned methods require modification in the infrastructure of the store. To avoid store modifications, robot-based systems have been suggested for scanning racks to detect and estimate stock level of each product on the shelves. Such systems use cameras or other sensors (barcode reader) for extracting the information. These systems can take images of the products and the shelves at close distances. However, the success of such robot-based systems depends on having a robust method for detecting and counting products directly from images taken from a moving camera. This detection typically depends on finding the difference in a current image and a previous image to know if a product has been restocked or removed. These methods of capturing, transmitting, comparing and then processing images to detect, recognize and count stock require significant amount of time as well as resources. Moreover, multiple cameras are required to capture images from various angles for obtaining accurate information, thus increasing the system cost.

Therefore, to limit the aforementioned drawbacks, there is still a need for a system which provides direct product recognition and count from captured images.

OBJECTS

Some of the objects of the present disclosure aimed to ameliorate one or more problems of the prior art or to at least provide a useful alternative are described herein below:

An object of the present disclosure is to provide a system for recognizing and counting products within images.

Further an object of the present disclosure is to provide a system that verifies planogram compliance.

Another object of the present disclosure is to provide a system that automates the process of retail monitoring and stock assessment.

Further, an object of the present disclosure is to provide a system which includes one or more movable image capturing devices to capture images in order to monitor shelves.

Yet another object of the present disclosure is to provide a system that computes direct and actual count of products visible in an image to indicate product availability.

In one embodiment, an object of the present disclosure is to provide a system that uses a single camera to capture images and directly computes product count from the captured images.

Still further object of the present disclosure is to provide a system that is robust to camera motion, in-plane pose changes, camera viewing angles, variation in illumination and scale of image.

Another object of the present disclosure is to provide a system that also recognizes and counts products that appear to be rigid and deformed in the images.

Yet another object of the present disclosure is to provide a system that recognizes and counts products in ambient light without requiring additional lighting.

Other objects and advantages of the present disclosure will be more apparent from the following description when read in conjunction with the accompanying figures, which are not intended to limit the scope of the present disclosure.

SUMMARY

The present disclosure relates to a computer implemented system and method for recognizing and counting stock within a defined environment. This environment comprises an area of shelves and aisles between shelves which are adapted to removably hold stock comprising clusters of products. In an embodiment, the system may comprise an intransient repository that stores a set of rules for (i) creating a k-d tree having descriptors from a plurality of pre-determined product templates, (ii) identifying descriptors in captured images, (iii) comparing the descriptors in the k-d tree with the identified descriptors and (iv) comparing number of descriptors with a first threshold value and a second threshold value. This intransient repository may also store a look-up table containing the plurality of pre-determined product templates corresponding to the products having pre-determined descriptors, the first threshold value and the second threshold value. The system may also include a processor that uses the stored set of rules to generate a set of commands based on the rules. The system may also include a k-d tree creator configured to cooperate with the processor to use the set of commands to create the k-d tree containing descriptors and to store the created k-d tree in the intransient repository. The system may also comprise at least one monitoring device adapted to move between the aisles. This monitoring device may be associated with an image capturing device which is configured to capture a plurality of images of the clusters of products.

A descriptor identifier is present in the system that cooperates with the processor to receive the set of commands and to receive the captured images from the monitoring device and it uses the received set of commands to identify descriptors in the captured images. A transient repository is present in the system to store these identified descriptors. The system then compares the number of the identified descriptors in the captured images with a stored first threshold value to obtain valid identified descriptors by using a first threshold comparator. A first descriptor comparator present in the system is configured to cooperate with the processor, the threshold comparator and the intransient repository, to compare valid identified descriptors in the captured images with the descriptors in the stored k-d tree to obtain matching descriptors based on the set of commands provided by the processor. The system further uses the set of commands to compare the number of matching descriptors in the captured images with a stored second threshold value to obtain suitable descriptors by using a second threshold comparator. Based on the obtained suitable descriptors, a template identifier identifies the plurality of product templates corresponding to the suitable descriptors from the stored look-up table and a product identifier recognizes products within the captured images from the stored look-up table based on the identified product templates. Based on the recognized products and the set of commands, a product counter present in the system counts products present in the captured images.

This summary is provided to introduce concepts related to recognizing and counting products within images, which is further described below in the detailed description. This summary is neither intended to identify essential features of the present disclosure nor is it intended for use in determining or limiting the scope of the present disclosure.

It is to be understood that both the foregoing general description and the following detailed description are exemplary and explanatory only and are not restrictive of the invention, as claimed.

BRIEF DESCRIPTION OF THE DRAWINGS

A computer implemented system for recognizing and counting products within images, of the present disclosure will now be described with the help of accompanying drawings, in which:

FIG. 6a and FIG. 6b illustrate pictorial representations of the method step in which products are recognized using a look-up table for matching descriptors;

FIG. 13 illustrates pictorial representations of the method step in which image showing all detected products with bounding boxes based on ROIs is obtained.

DETAILED DESCRIPTION

Figure 1:
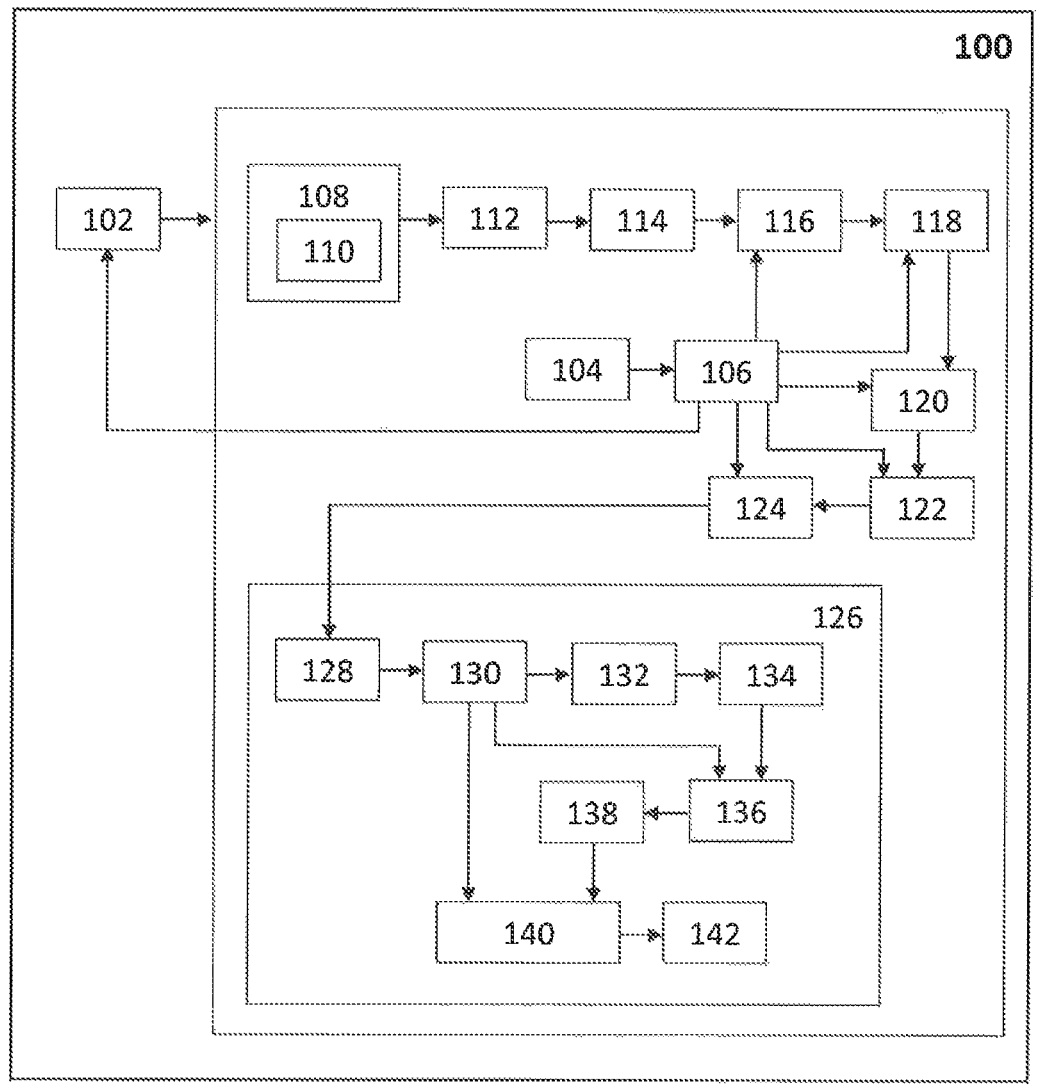
FIG. 1 illustrates a schematic of an embodiment of the system for recognizing and counting products within images.

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the nonlimiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure envisages a system and method that automates the process of retail monitoring and stock assessment by directly recognizing and counting products within images. In one embodiment, products are recognized and counted using point-based features. Product recognition is carried out by searching for queried features in a k-d tree using nearest-neighbor search and inverted index look up table for product templates. Products within the images are then counted by computing maximum feature repeatability for each category of features. Another aspect is to obtain the arrangement of products on the shelves by fitting a rectangular bounding box around each identified product. The arrangement of products on the shelves is a part of planogram and is obtained for verifying planogram compliance. Each bounding box region is removed or masked from the image and the process is repeated. In case sufficient matching descriptors are not found for a given region, a local grid search based on color histogram matching is used to identify the product. The number of bounding boxes thus obtained provides the total product count.

Definitions of Terms Used in the Specification

The expression 'descriptors' used hereinafter in this specification refers to features/interest points in the images that enable classification of content within the images.

The expression 'k-d tree' used hereinafter in this specification refers to a k-dimensional tree that organizes descriptors within images in a k-dimensional space, wherein 'k' is any integer that represents the number of dimensions. A k-d tree structure facilitates faster search for a matching descriptor as compared to other data structures such as arrays or hash-tables.

The expression 'SURF' used hereinafter in this specification stands for Speeded Up Robust Features and refers to a detector which is scale and rotation-invariant. It is used to identify the descriptors within images.

The expression 'RANSAC' used hereinafter in this specification refers to random sample consensus which is a method of removing outliers from a set of matching points/descriptors based on their arrangement (homography).

The expression 'homography' represents the arrangement of point features/descriptors in a given image. It is used by RANSAC to remove outliers in a set of points obtained through matching.

The expression 'planogram compliance' used hereinafter in this specification refers to a set of store related rules, policies or standards that are followed by the system of the present disclosure to ensure that product placement on the shelves conforms to the store's compliance. This includes verifying if a particular product is present at a given location or not.

The expression 'nearest neighborhood search' used hereinafter in this specification refers to a technique of determining all the neighboring descriptors in the k-d tree that satisfy a user-defined threshold on the distance ratio. A template corresponding to the nearest descriptors is selected as a product category for a queried feature.

The expression 'color histogram matching' used hereinafter in this specification refers to a method of color adjustment of two images using the image histograms.

The expression 'bounding box' used hereinafter in this specification refers to a polygonal box surrounding a product being detected, such that it confirms detection of the discrete product and provides information about the product's orientation in an image plane.

The expression 'local grid search' used hereinafter in this specification refers to a method of detecting products in the vicinity of another product (which was successfully detected using SURF) for which SURF descriptors are not easily available. The method includes creating a 3×3 grid with a current product at the grid center and then applying color-based histogram matching to find the presence of another product (similar to the one at the center) for a given cell in the grid.

The expression 'Euclidean distance' used hereinafter in this specification refers to an ordinary straight line distance between two points.

The expression 'inverted index table' used hereinafter in this specification refers to a table that contains a product ID for each point feature/descriptor present in the k-d tree. It is an index data structure storing a mapping from content, such as words or numbers, to its locations in a repository, or in a document or a set of documents.

These definitions are in addition to those expressed in the art.

Referring to the accompanying drawings, FIG. 1 illustrates a schematic of an embodiment of the system for recognizing and counting products within images. The system 100 recognizes and counts stock within an enclosed environment comprising an area of shelves and aisles between the shelves. These shelves removably hold stock which essentially comprises clusters of products. The system 100 includes an intransient repository 106 which stores a set of rules to create a k-d tree which has descriptors from a plurality of pre-determined product templates. It also stores a set of rules to identify descriptors in captured image, compare the descriptors in the k-d tree with the identified descriptors and compare number of descriptors with a first threshold value and a second threshold value. The intransient repository 106 also stores a look-up table, the first threshold value and the second threshold value to obtain suitable descriptors for product recognition and comparison. The look-up table contains a plurality of pre-determined product templates corresponding to the products having pre-determined descriptors. Based on the stored set of rules, a processor 102 generates a set of commands that are provided to various modules of the system 100. Based on the set of commands provided by the processor 102 to create the k-d tree, a k-d tree creator 104 present in the system 100 creates the k-d tree having descriptors. This k-d tree is then stored in the intransient repository 106 and it contains descriptors from a plurality of pre-determined product templates. The k-d tree is created in the SURF descriptor space for all pre-determined product templates. In an embodiment, the step of k-d tree creation is carried out off-line. The system 100 further includes at least one monitoring device 108 which moves between the aisles in order to monitor and assess the stock. This monitoring device 108 includes an image capturing device 110 which captures a plurality of images of the clusters of products to enable product identification. In one embodiment, the image capturing device 110 is a monocular camera. In an embodiment, the image capturing device can be a handheld device which is moved between the aisles for scanning the shelves. The system 100 does not require any additional sensors to detect, recognize and count the products. The images that are captured by the image capturing device 110 are received by a descriptor identifier 112 present in the system 100. The descriptor identifier 112 identifies descriptors within the received captured images based on the set of commands provided by the processor 102. The descriptors are pre-determined interest point features within the captured images. In one embodiment, the system 100 uses SURF techniques to identify the descriptors within the images. Once the descriptors are identified, a transient repository 114 stores these identified descriptors. A first threshold comparator 116 present in the system 100 then compares the number of stored identified descriptors with the first threshold value that is stored in the intransient repository 106 based on the set of commands provided by the processor 102 to obtain valid identified descriptors. If the number of identified descriptors is less than the first threshold value, the product is not recognizable and the steps involved in obtaining and comparing the descriptors are repeated till satisfaction number of descriptors is available. Further, when valid identified descriptors are obtained, in order to recognize products in the captured images, a first comparator 118 present in the system 100 cooperates with the processor 102, the first threshold comparator 116 and the intransient repository 106 and uses the set of commands provided by the processor 102 to compare the valid identified descriptors in the captured images with the descriptors in the stored k-d tree to obtain matching descriptors. For a captured image, in an embodiment, the matching descriptors are obtained using nearest neighborhood search. All the neighbors in the k-d tree which satisfy a user-defined threshold on distance ratio are considered to be valid matches. The distance ratio is the ratio of Euclidean distance (in feature space) of the nearest neighbor to that of the second nearest neighbor. The value of the distance ratio varies from 0 to 1. Lower values of the distance ratio indicate good matching between the query feature and its nearest neighbor in the k-d tree. Once the matching descriptors are obtained, a second threshold comparator 120 uses the matching descriptors and compares the number of matching descriptors to the stored second threshold value to obtain suitable descriptors. The product template associated with each neighboring node in the k-d tree is then obtained by a template identifier 122. The template identifier 122 identifies the plurality of product templates corresponding to the suitable descriptors from the stored look-up table. In an embodiment, the template identifier 122 uses an inverted index table technique to obtain product templates. The inverted index table consists of product template ID for each feature (or descriptor) in the k-d tree. For example, if there are 3 descriptors in a product template whose ID is 5, the inverted index table for these descriptors is illustrated below in TABLE 1.

TABLE 1

| <Feature Number> | <Product ID> |
|---|---|
| 1 | 5 |
| 2 | 5 |
| 3 | 5 |

When a matching descriptor in the k-d tree is obtained, a corresponding product template from which this matching feature has been taken is also identified. A product template for every query feature can thus be identified. A product is then recognized when a majority of query features match a single product template corresponding to the product. A product identifier 124 present in the system 100 then recognizes products within the captured images based on the identified product templates. A product is recognizable if it contains a number of descriptors above given thresholds.

Once the products are recognized by the product identifier 124, a product counter 126 present in the system 100 uses these captured images containing the recognized products, to count products based on the number of recognized products within the captured images. The system 100 of the present disclosure uses the set of commands provided by the processor 102 to count the products which are visible in the camera images. Obtaining discrete product count is useful for high valued items and bigger products which are easy to detect using image processing techniques. This product count is also sufficient for detecting out of stock (OOS) situations and misplaced items provided a planogram is available.

In one embodiment, the product counter 126 computes maximum repeatability of a given product feature within the captured image. Repeatability of a descriptor is the number of times this particular feature is repeated in a given set. It is based on the observation that the same SURF descriptors will get repeated if there are multiple products of the same type. Counting the number of times these features are repeated provides the actual number of products present in the captured image. This approach is fast and easily implementable. It is also robust to rotation and scaling effects. However, it relies on finding at least one descriptor for all the products. It may also be prone to noise, and so the system 100 is configured to fine tune the distance threshold to remove possible wrong observations.

In another embodiment, the product counter 126 uses the set of commands provided by the processor 102 to count the products within captured images by using SURF and homography techniques. The product counter 126 includes a receiver 128 which receives the captured images having the recognized products from the product identifier 124. On reception of images, an ROI creator 130 create regions of interest around the recognized products within the received captured images and fits a bounding box around each of the created regions of interest to obtain first images. In one embodiment, the regions of interest or bounding box for each product is obtained by using SURF correspondence and homography techniques. These techniques are robust when sufficient numbers of descriptors are available for a product. When descriptors are available, a local search based on colour histograms is carried out around the detected products. Once the ROI creator 130 creates regions of interest around the recognized products, an ROI remover 132 removes sections of images corresponding to the recognized products that are fitted with bounding boxes to obtain edited images. A grid creator 134 then creates grids over these edited images and these edited images having grids are provided to a second comparator 136. The second comparator 136 cooperates with the ROI creator 130 to receive captured images with bounding boxes and it also receives edited images having grids from the grid creator 134. The second comparator 136 then compares the received captured images and the edited images and identifies undetected products. The recognized products are filtered from the edited images and these images are provided to a product recognizer 138. The product recognizer 138 cooperates with the second comparator 136 to recognize the undetected products with the help of colour histogram techniques and also create regions of interest around the recognized undetected products. The product recognizer 138 also fits a bounding box around each of the created regions of interest to obtain second images. The first images obtained by the ROI creator 130 and the second images obtained by the product recognizer 138 are received by an ROI identifier 140. The ROI identifier 140 combines these received images and identifies matching regions of interest corresponding to matching products within the received images. A counter 142 associated with the product counter 126 then counts number of bounding boxes corresponding to matching regions of interests within the received images to obtain product counts for particular products. Based on the recognition and product count, the system is able to detect out of stock situations and misplaced products in the defined enclosed environment by using planogram of the enclosed environment The bounding boxes that are fitted around the products based on the ROIs can be of different shapes including a polygon which enables the system of the present disclosure to recognize and count products appearing to be rigid or deformed and having different orientations in the images. In one embodiment, the system uses a single camera to capture images and as the product recognition is based on the descriptors identified within the image, product recognition and counting using this system is independent of camera motion, camera viewing angles, variation in illumination and scale of image. Additionally, the system does not require additional lighting arrangements.

Figure 2:
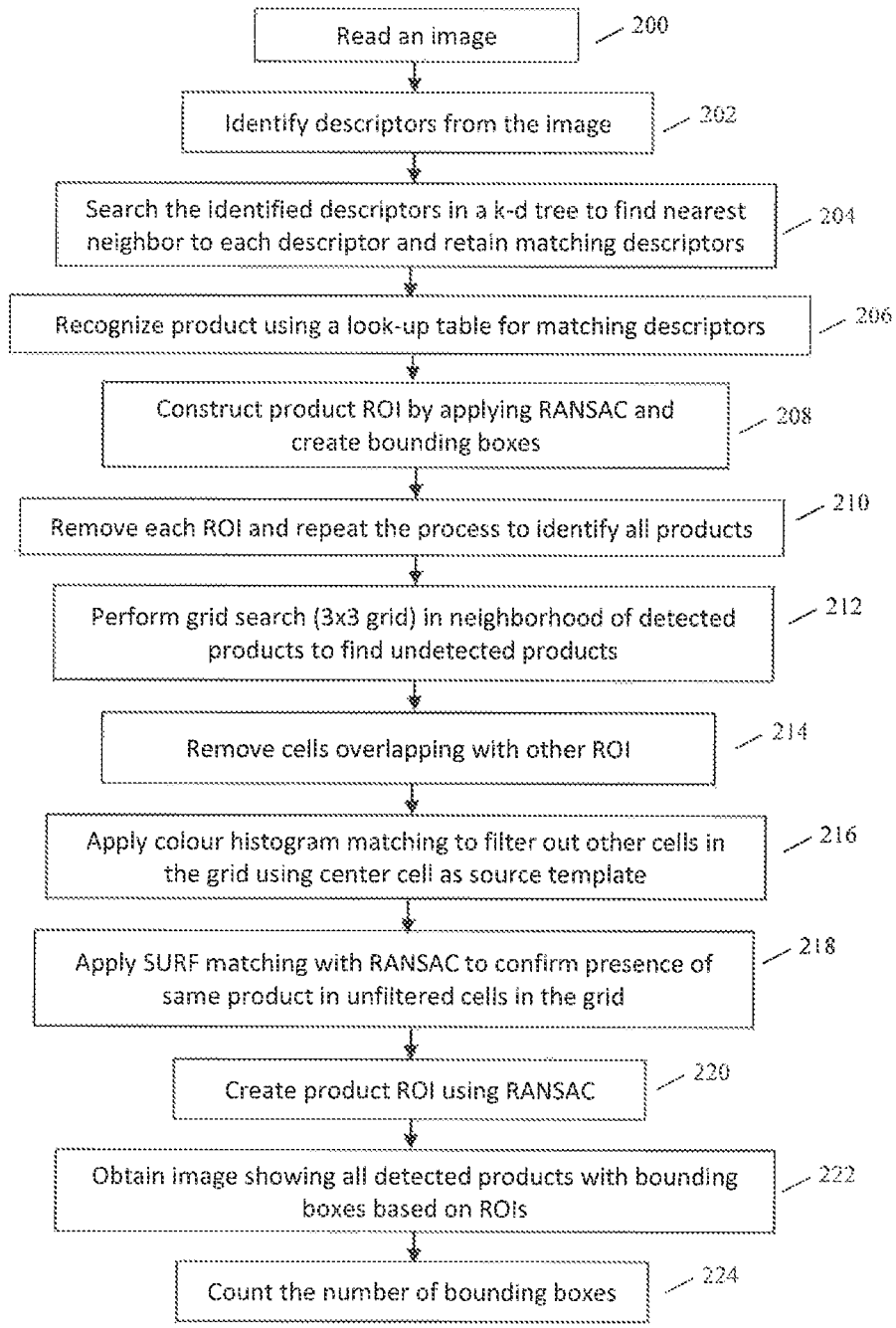
FIG. 2 illustrates a flow diagram of an embodiment of the system for recognizing and counting products within images.
Figure 3:
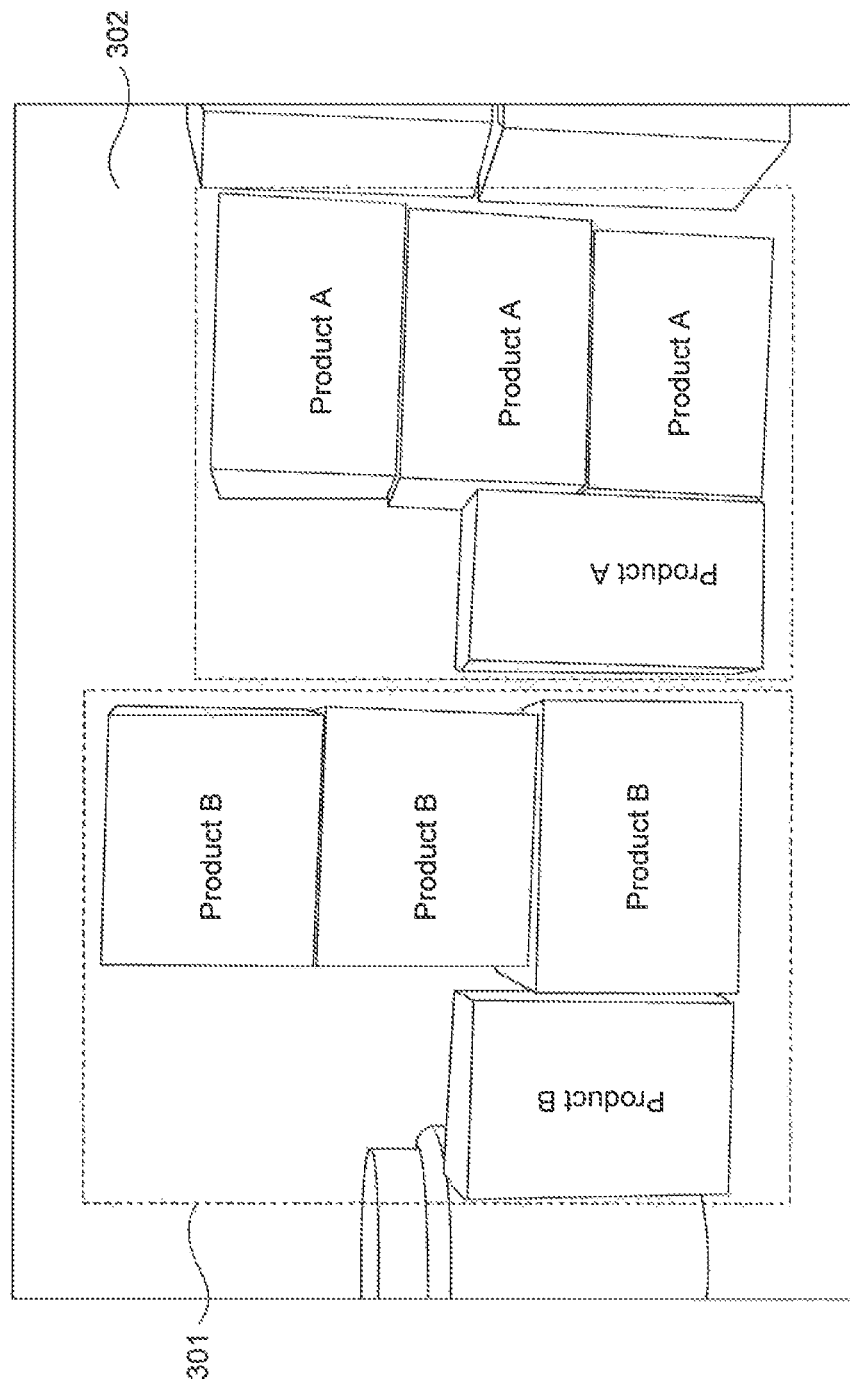
FIG. 3 illustrates a pictorial representation of the method step in which an image is read.
Figure 4:
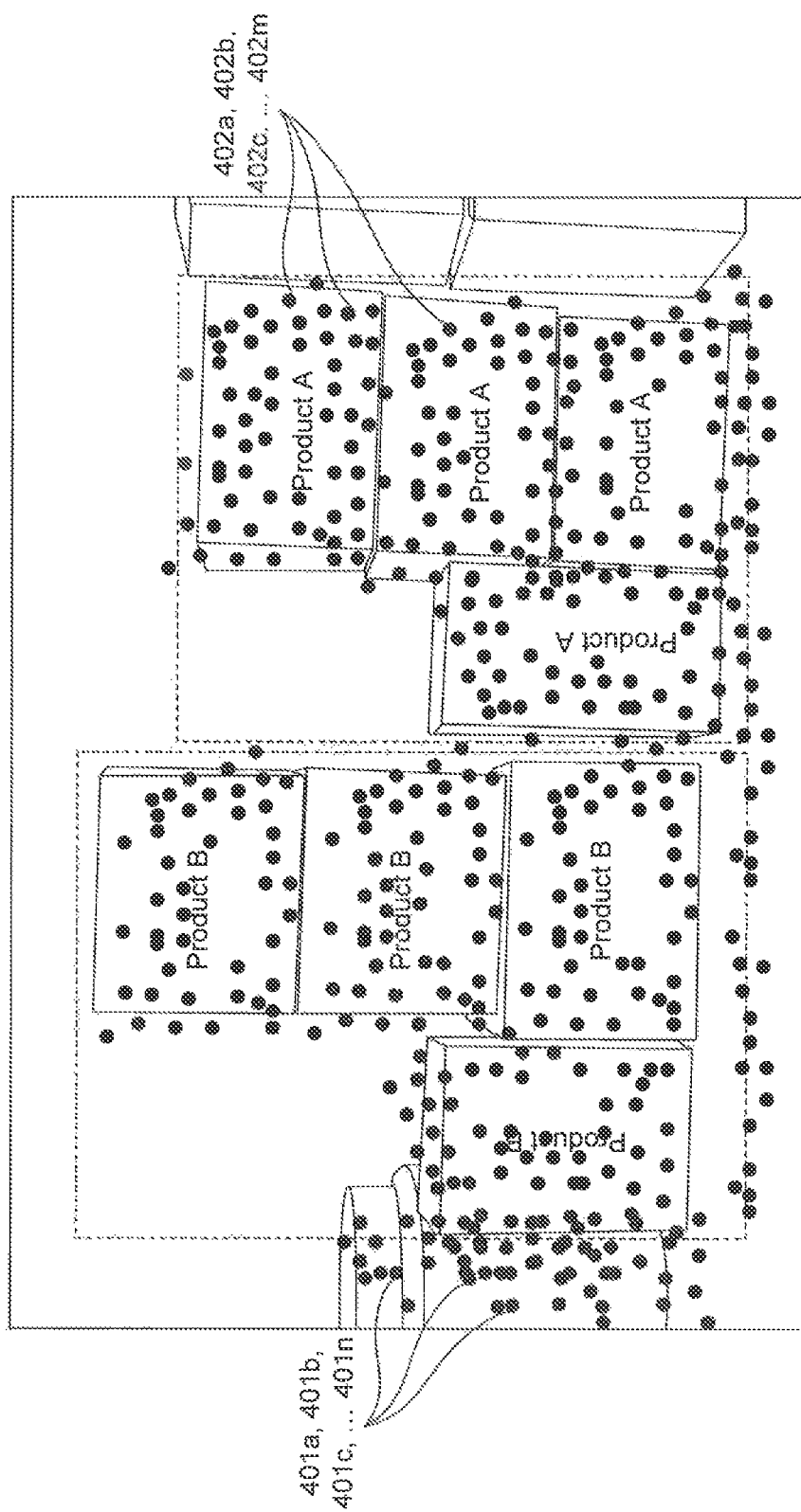
FIG. 4 illustrates a pictorial representation of the method step in which descriptors are identified in an image.
Figure 5:
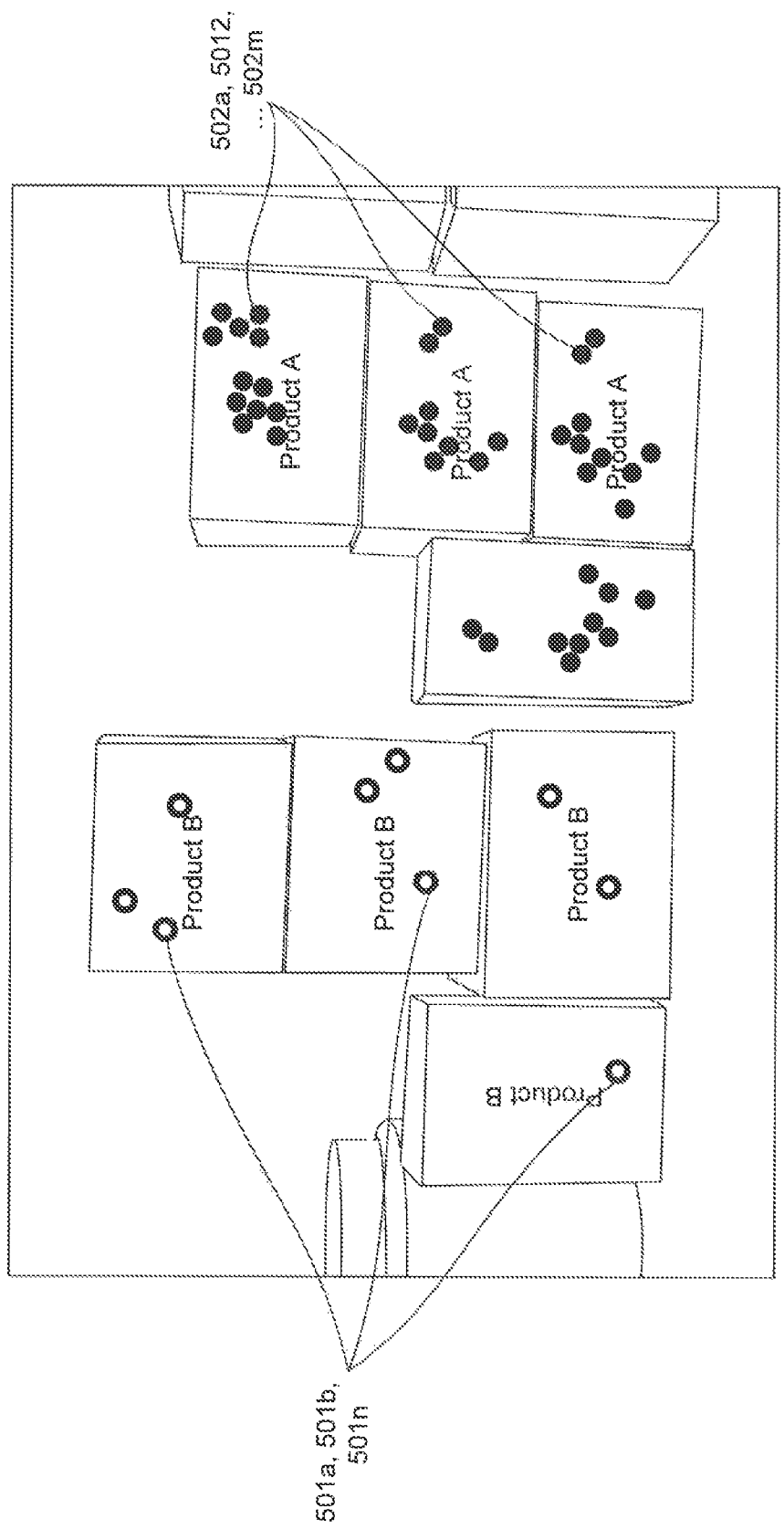
FIG. 5 illustrates a pictorial representation of the method step in which identified descriptors in a k-d tree are searched to find nearest neighbor to each descriptor and matching descriptors are retained.
Figure 6B:
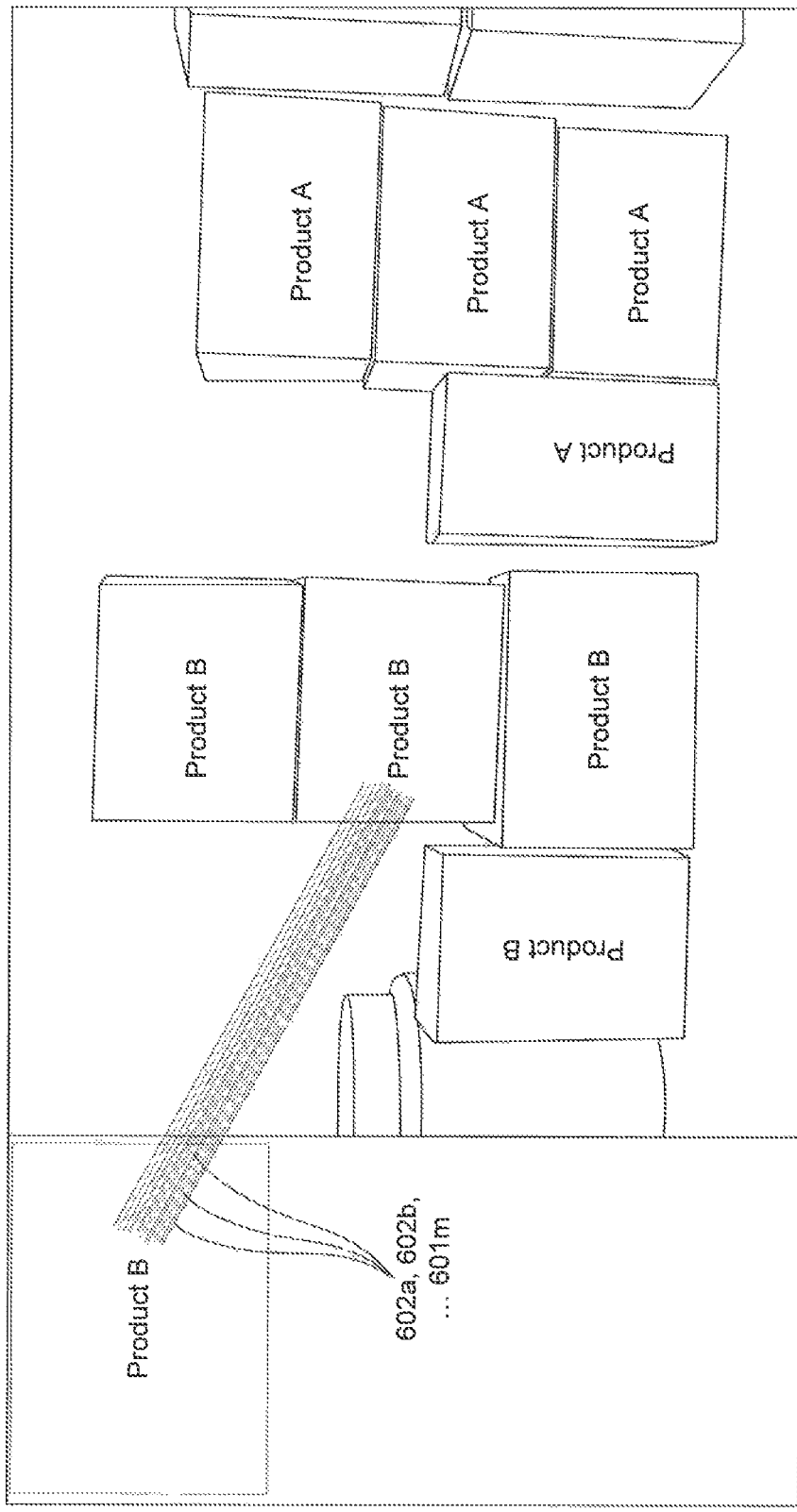
Figure 7A:
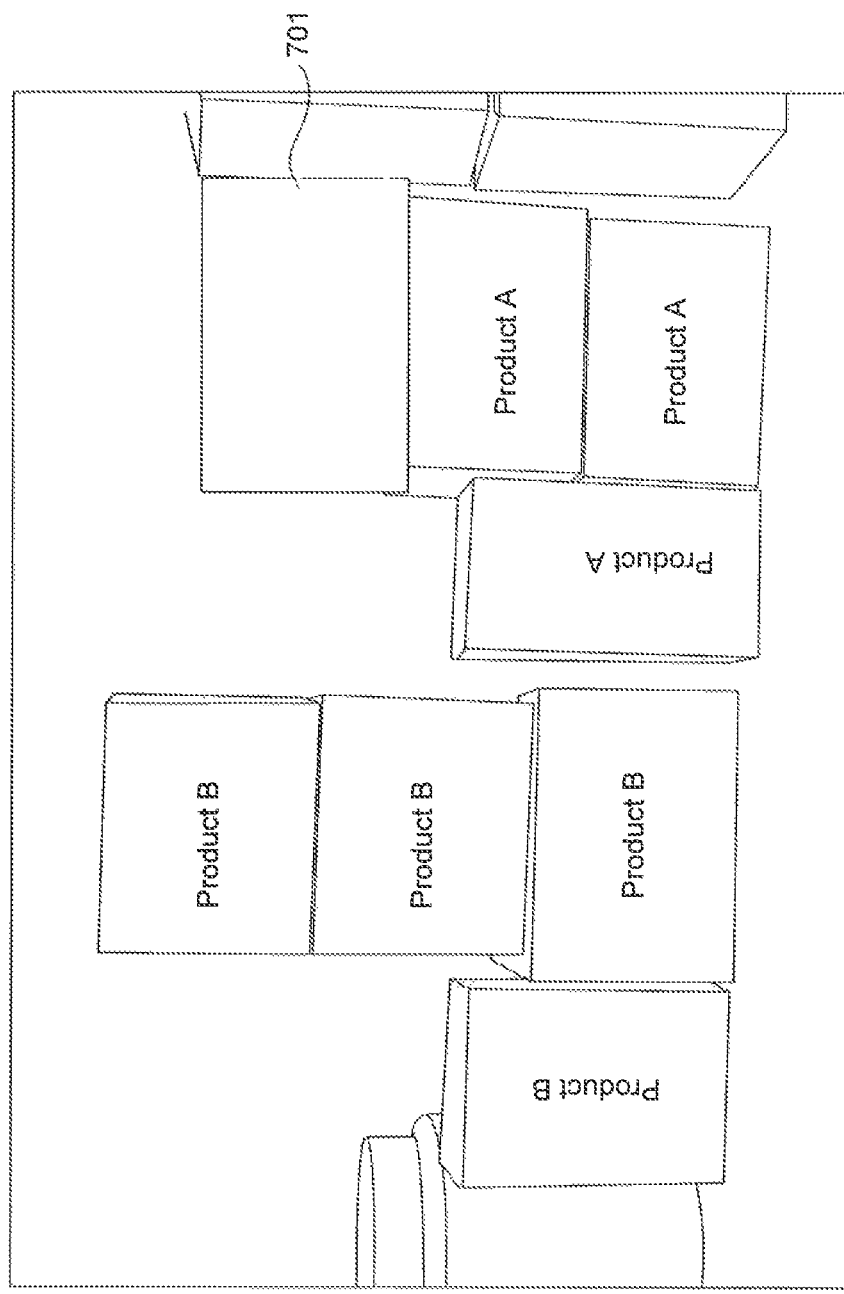
FIG. 7a and FIG. 7b illustrate pictorial representations of the method step in which each bounding box is removed and the process is repeated to identify all products.
Figure 7B:
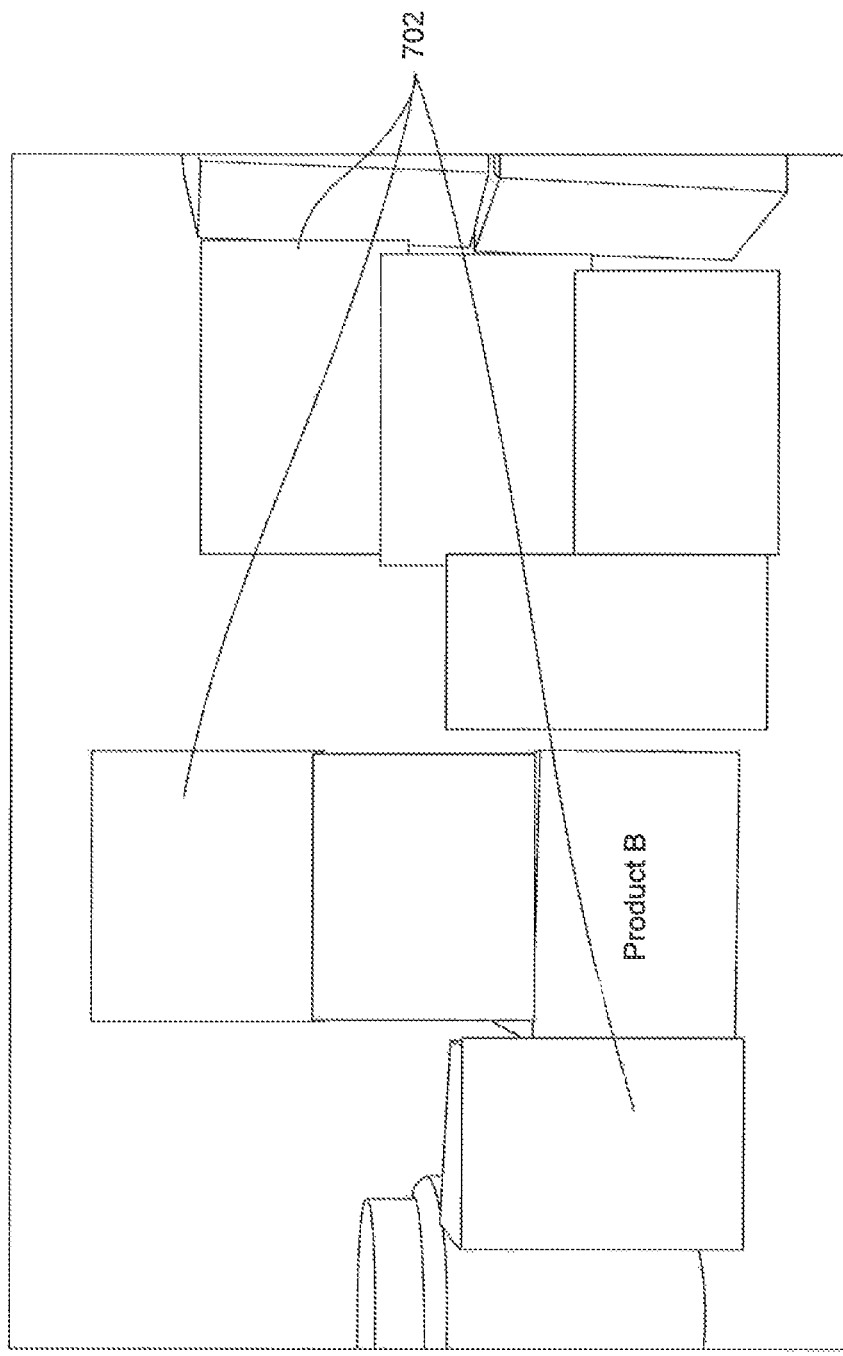

Referring to the accompanying drawings, FIG. 2 of the accompanying drawings illustrates a flow diagram of an embodiment of the system of the present disclosure for recognizing and counting products within images. An image capturing device associated with a monitoring device present in the system captures an image which is read 200 by the system to identify descriptors within the image 202. In an embodiment, FIG. 3 illustrates an image which is read by the system and FIG. 4 illustrates identified descriptors within the read image. The image illustrated in FIG. 3 includes a plurality of different product clusters indicated by 301 and 302. Each product in the cluster defines a plurality of interest features 401a, 401b, 401c, . . . , 401n and 402a, 402b, 402c, . . . , 402m as illustrated in FIG. 4. These interest features are descriptors of the image. They enable recognition of products based on product specific features like points, edges or objects present in the image. Based on the identified descriptors, a search in conducted wherein, the identified descriptors are searched in a k-d tree to find nearest neighbor to each descriptor and the matching descriptors that are obtained are retained 204. FIG. 5 of the accompanying drawings illustrates an image of the retained matching descriptors, where two different categories of products are illustrated with two different symbols for the retained descriptors viz. circles 501a, 501b, . . . , 501n and rings 502a, 502b, . . . , 502m. The k-d tree is created offline and consists of descriptors from a plurality of pre-determined product templates. In one embodiment, the k-d tree is created in the SURF descriptor space for all the pre-determined product templates. This created k-d tree is stored in an intransient repository along with a look-up table that contains the plurality of pre-determined product templates corresponding to the products having pre-determined descriptors. Based on the search, the matching descriptors are obtained. These matching descriptors are used to search the stored look-up table to recognize products corresponding to the matching descriptors 206. FIG. 6a and FIG. 6b illustrate the images in which products are recognized using a look-up table for matching descriptors. The look-up process concept is depicted pictorially in FIG. 6a and FIG. 6b, where the rays 601a, 601b, . . . , 601n and 602a, 602b, . . . , 602m depict the matching process of the descriptors in the stored look-up table and those within the captured image. Once the products are recognized product regions of interest (ROIs) are constructed around the identified products by applying random sample consensus techniques (RANSAC) 208. Each constructed ROI is then removed to identify all the products 210 in the image. FIG. 7a and FIG. 7b illustrate the step in which each bounding box/constructed ROI is removed to identify all products. This is represented by the space marked by 701 and 702. If sufficient numbers of descriptors are not available, it is difficult to detect and recognize a product.

Figure 8:
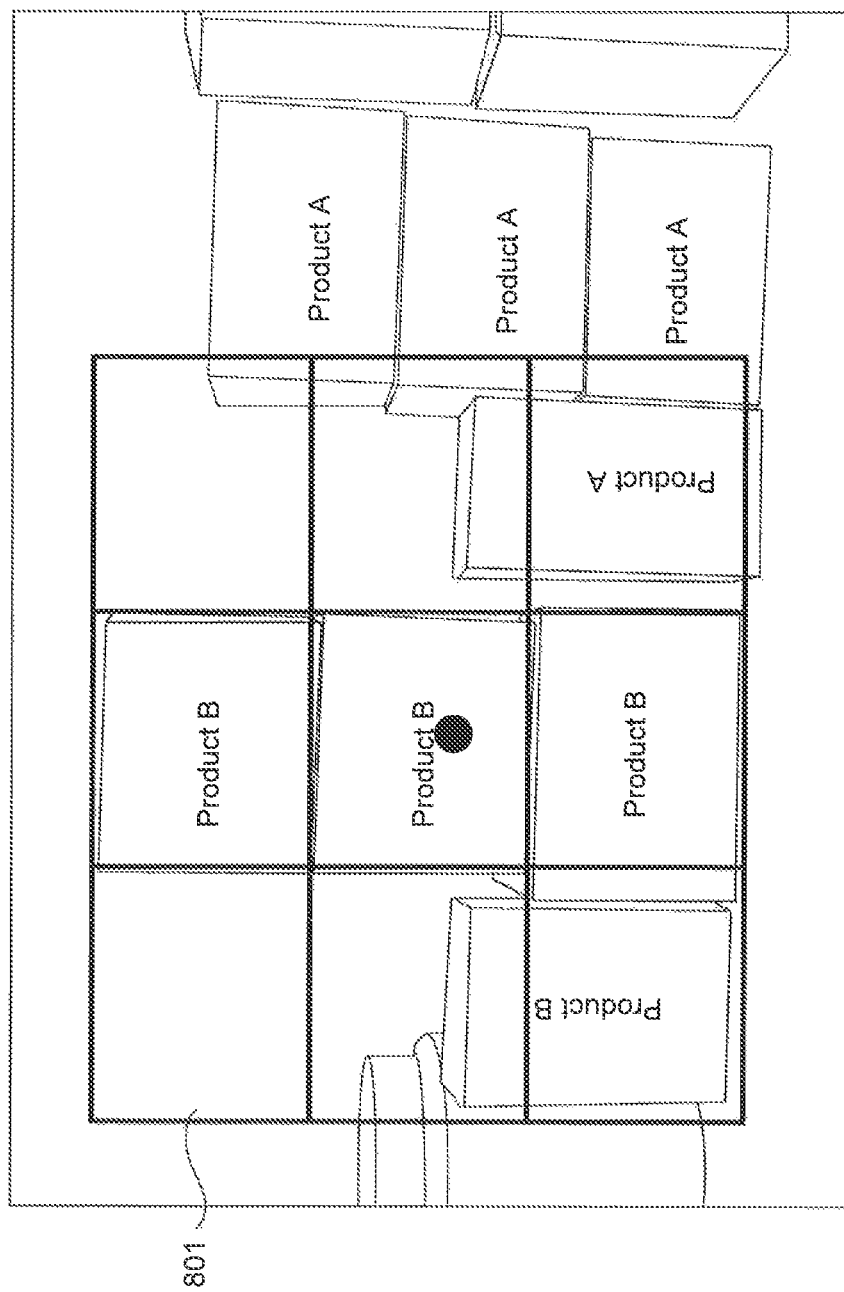
FIG. 8 illustrates pictorial representations of the method step in which a grid search (3×3 grid) is performed in neighborhood of the detected products to find undetected products.
Figure 9:
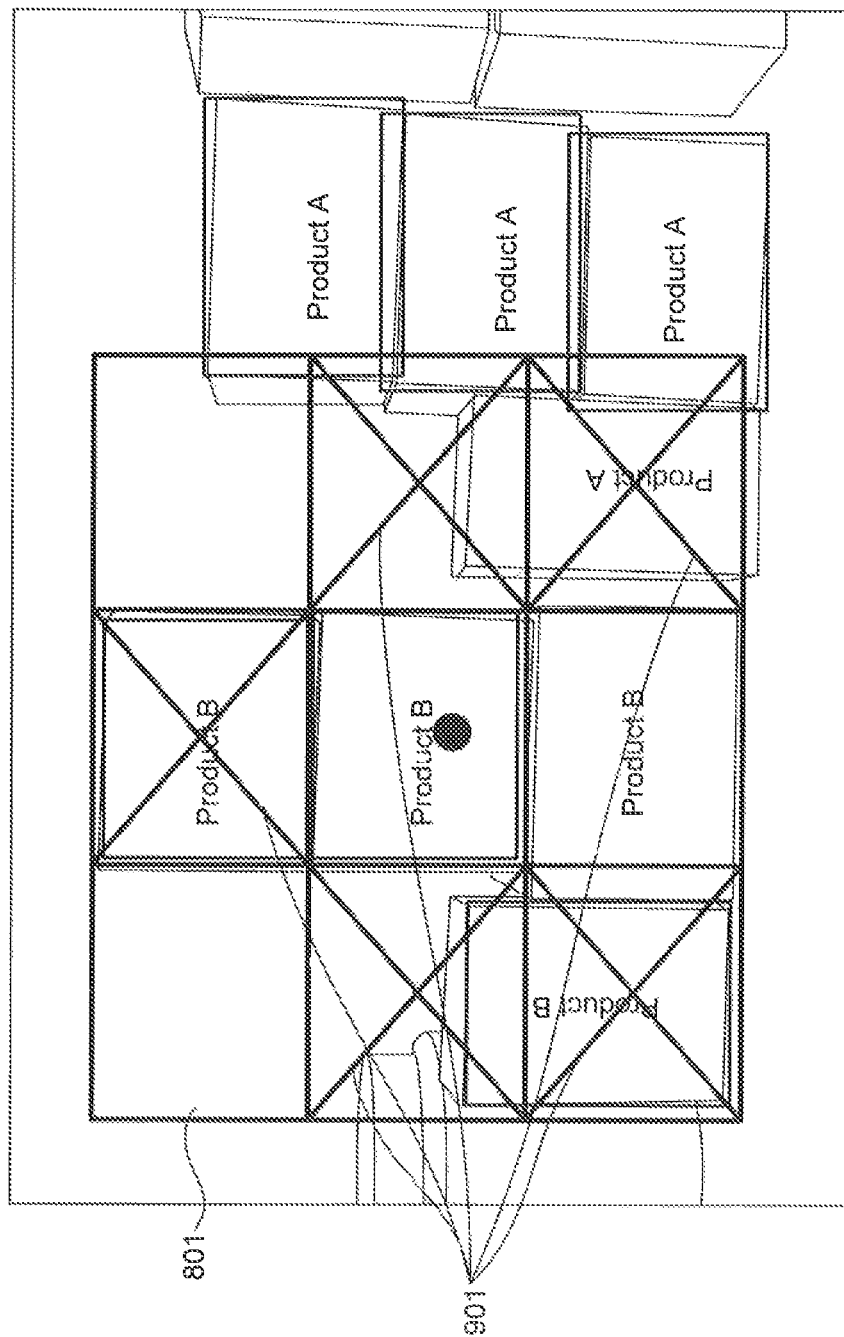
FIG. 9 illustrates pictorial representations of the method step in which cells overlapping with other ROI are removed.
Figure 10:
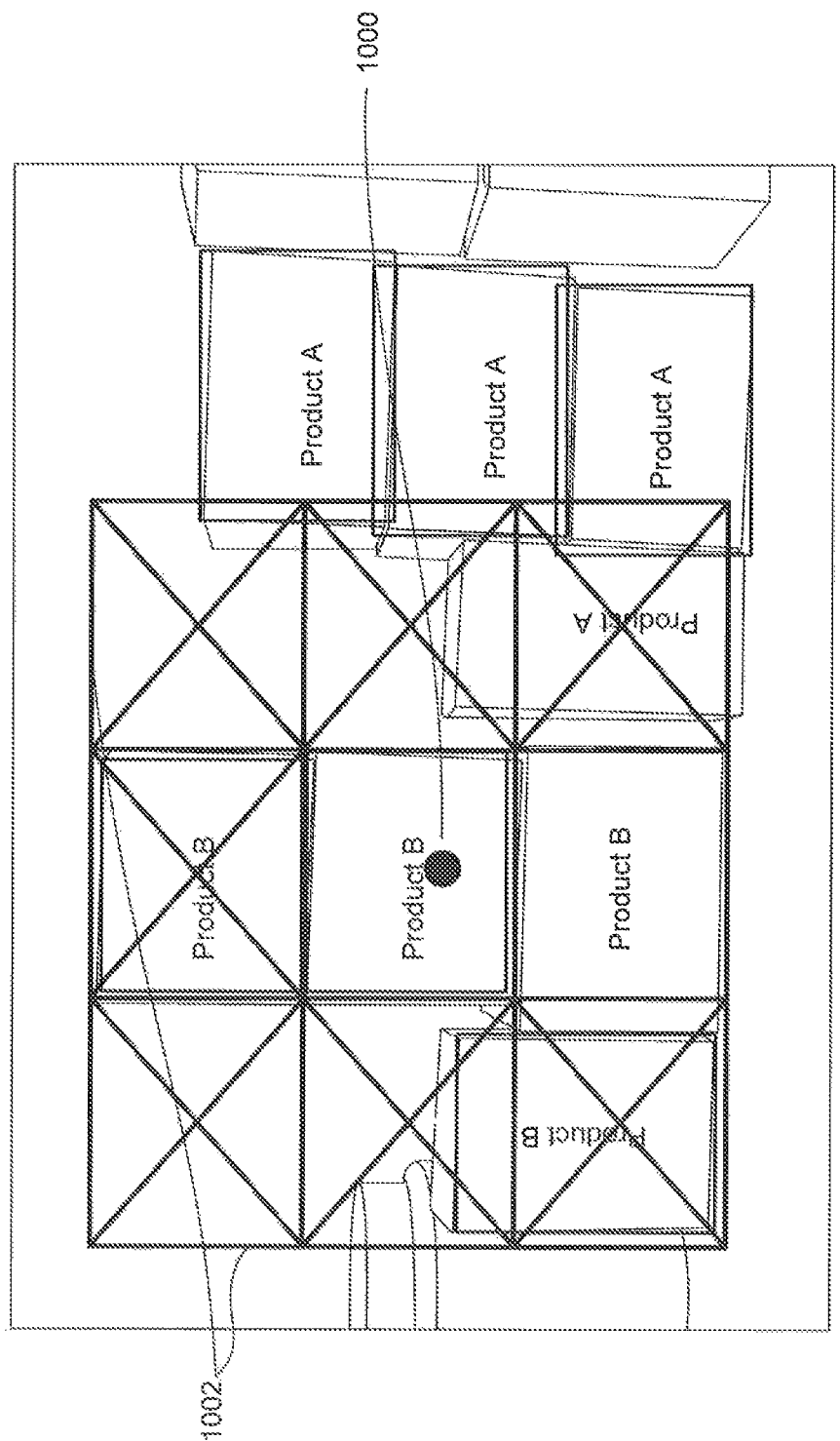
FIG. 10 illustrates pictorial representations of the method step in which colour histogram matching is applied to filter out other cells in the grid using center cell as source template.
Figure 11:
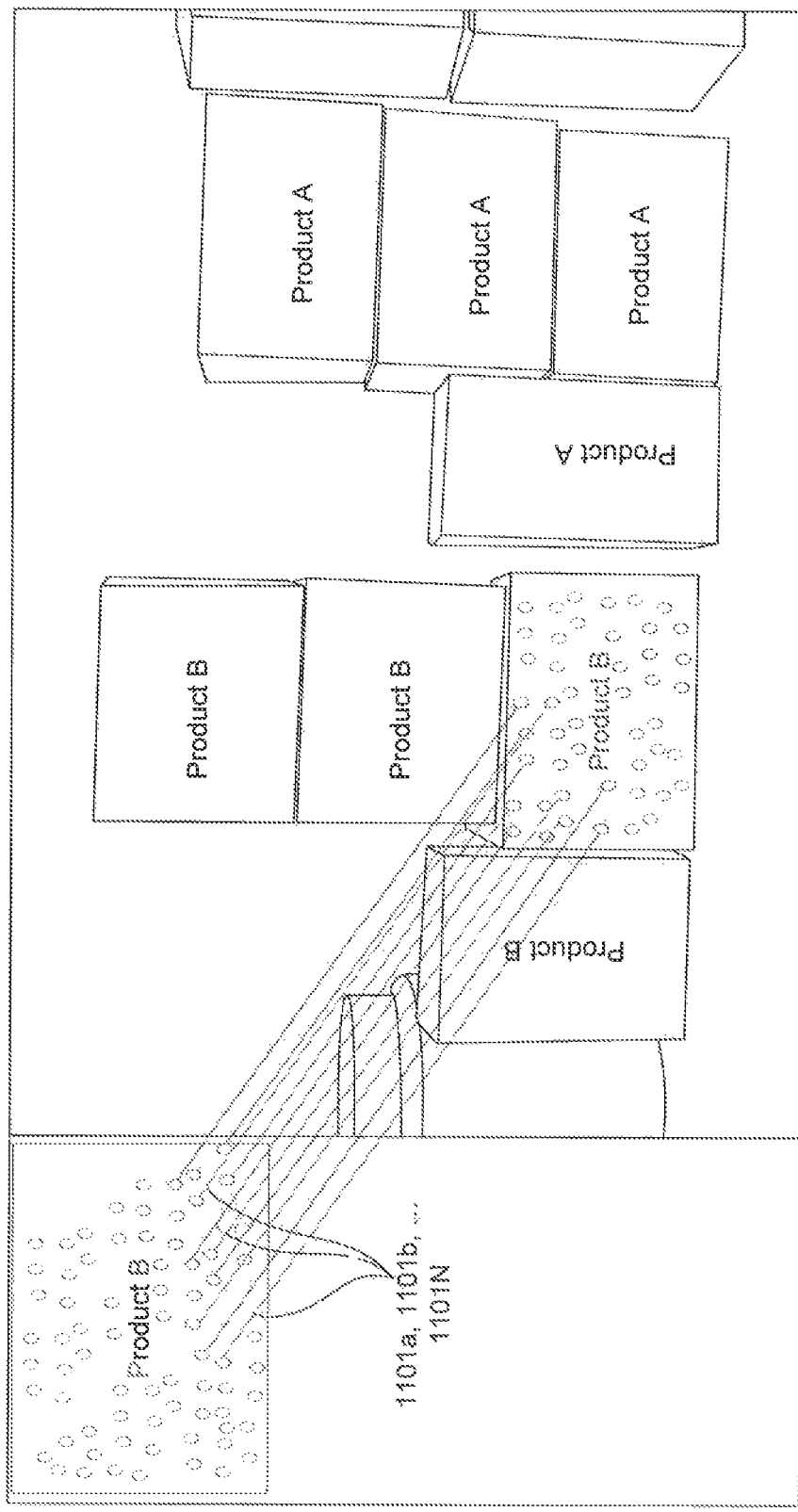
FIG. 11 illustrates pictorial representations of the method step in which SURF matching with RANSAC is applied to confirm presence of same product in unfiltered cells in the grid.
Figure 12:
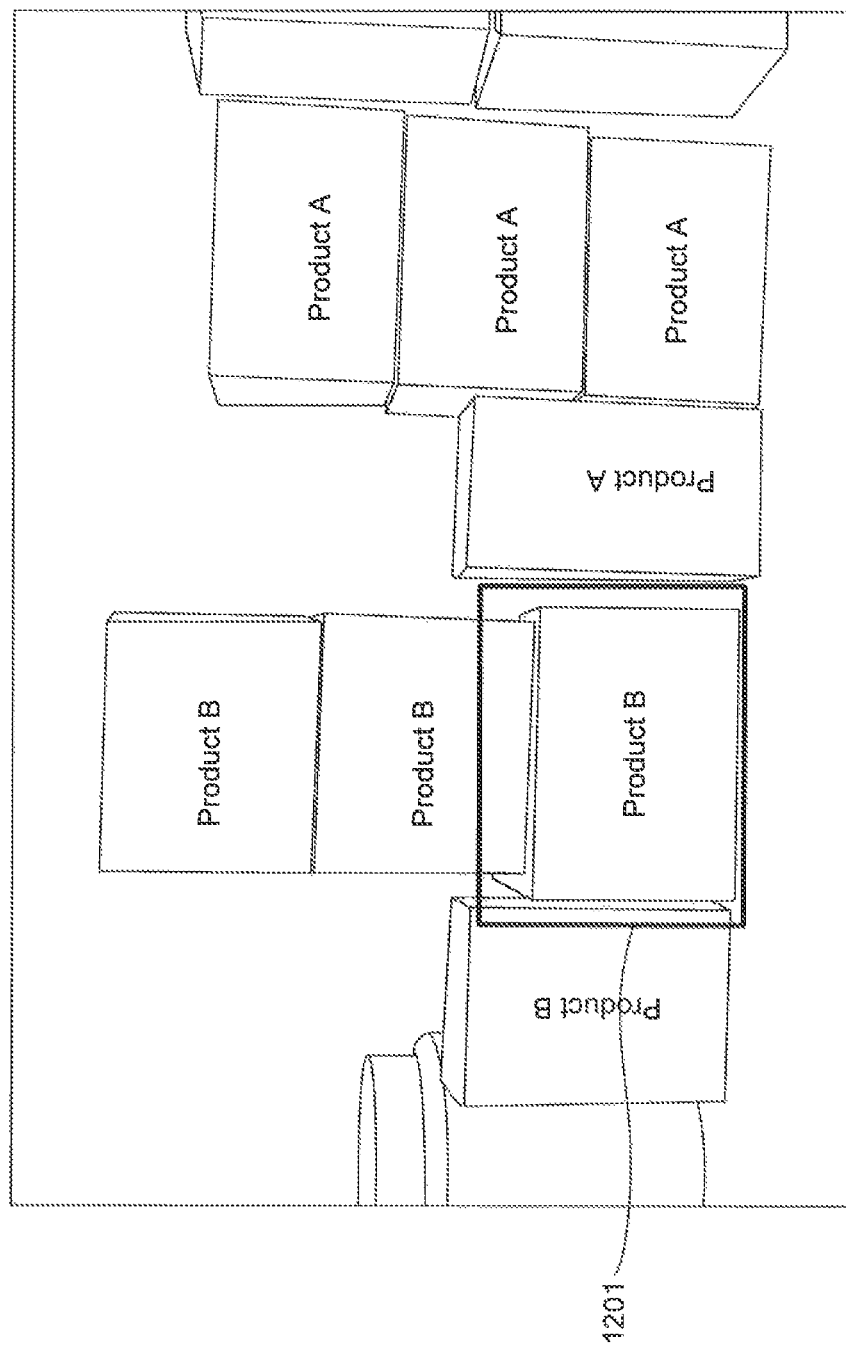
FIG. 12 illustrates pictorial representations of the method step in which product ROI is created using RANSAC.

There is a possibility that some of the products in the image are not recognized due to insufficiency of descriptors. In order to overcome this, a grid search is performed. In one embodiment a 3×3 grid is created on the image as illustrated in FIG. 8 by reference numeral 801, and a grid search is performed in the neighborhood of the detected products within the image to find undetected products 212. The cells of the grid that overlap the detected products in the image are then removed 214 to focus on the undetected products. FIG. 9 illustrates an image in which cells overlapping with other ROI are removed. This is depicted with crossed cells 901 within the 3×3 grid 801. Remaining cells in the grid are then matched with the center product through colour histogram matching and, the non-matching cells are filtered out 216 as illustrated in FIG. 10, where the non-matching cells are represented by reference numeral 1002. In this case, the center cell 1000 in the grid acts as a source template. The cell that satisfies histogram matching threshold with the center cell 1000 is assigned the label of the center cell, SURF matching with RANSAC is then applied to confirm the presence of same product in the unfiltered cells in the grid 218. This is illustrated in FIG. 11 of the accompanying drawings where the rays 1101a, 1101b, . . . , 1101n depict the SURF matching process. Product ROI is then created using RANSAC 220 on the detected products. FIG. 12 illustrates an image with the created product ROI 1201 on the detected product. Bounding boxes are then fitted around the newly detected ROIs using SURF correspondence and homography techniques. The image showing all the detected products with bounding boxes based on the ROIs is then obtained 222. FIG. 13 of the accompanying drawings illustrates this image showing all the detected products with bounding boxes where the reference numerals 1301a, 1301b, 1301c, 1301d and 1302a, 1302b, 1302c, 1302d represent the bounding boxes of the detected products. These bounding boxes are then counted 224 to obtain product counts corresponding to particular products in the image.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer implemented system for recognizing and counting stock for detecting out of stock situations and misplaced products by directly recognizing and counting the products from captured images within a defined environment comprising an area of shelves and aisles between the shelves, the shelves adapted to removably hold the stock comprising clusters of products, the system comprising:
    an intransient repository configured to store a set of rules to: (i) store descriptors from a plurality of pre-determined product templates using a k-d tree; (ii) identify descriptors in the captured images; (iii) compare the descriptors in the k-d tree with the identified descriptors; and (iv) compare number of descriptors with a first threshold value and a second threshold value, the intransient repository further configured to store a look-up table containing the plurality of pre-determined product templates corresponding to the products having pre-determined descriptors, the first threshold value and the second threshold value;
    a processor configured to cooperate with the intransient repository to receive the set of rules and further configured to use the received set of rules to generate a set of commands to store the k-d tree with descriptors in the intransient repository;
    at least one monitoring device adapted to move between the aisles, the monitoring device associated with an image capturing device configured to capture a plurality of images of the clusters of products;
    a descriptor identifier configured to cooperate with the processor to receive the set of commands and with the monitoring device to receive the captured images and further configured to use the received set of commands to identify descriptors in the captured images, wherein the descriptors are pre-determined interest point features in the captured images;
    a transient repository configured to cooperate with the descriptor identifier to receive and store the identified descriptors;
    a first threshold comparator configured to cooperate with the processor to receive the set of commands, with the transient repository to receive the stored captured images having the identified descriptors and with the intransient repository to receive the stored first threshold value, and further configured to use the received set of commands to compare number of the identified descriptors in the captured images with the received first threshold value to obtain valid identified descriptors;

a first comparator configured to cooperate with the processor, the first threshold comparator and the intransient repository, and further configured to compare based on the set of commands, the valid identified descriptors in the captured images with the descriptors in the stored k-d tree to obtain matching descriptors;

a second threshold comparator configured to cooperate with the processor to receive the set of commands, with the first comparator to receive captured images having the obtained matching descriptors and with the intransient repository to receive the stored second threshold value, and further configured to use the received set of commands to compare number of the matching descriptors in the captured images with the received second threshold value to obtain suitable descriptors;

a template identifier configured to cooperate with the intransient repository and the second threshold comparator, and further configured to identify the plurality of product templates corresponding to the suitable descriptors from the stored look-up table;

a product identifier configured to cooperate with the template identifier to receive the identified product templates and the intransient repository to receive the stored look-up table, and further configured to recognize products within the captured images from the stored look-up table based on the identified product templates; and a product counter configured to cooperate with the processor to receive the set of commands and with the product identifier to receive the captured images containing the recognized products, and further configured to use the received set of commands to count products based on the number of recognized products within the captured images, wherein the product counter configured to cooperate with the descriptor identifier to receive images of products having descriptors and further configured to compute maximum repeatability of particular descriptors in the received images to count number of times the particular descriptors are repeated in order to obtain product count within the received images.

2. The system as claimed in claim 1, wherein the image capturing device is a monocular camera configured to capture images of the clusters of products placed on the shelves.

3. The system as claimed in claim 1, wherein the product counter comprises:

a receiver configured to cooperate with the product identifier to receive the captured images having the recognized products;

a region of interest (ROI) creator configured to create regions of interest around the recognized products in the received captured images and fit a bounding box around each of the created regions of interest to obtain first images;

an ROI remover configured to cooperate with the ROI creator to remove sections of images corresponding to the recognized products that are fitted with bounding boxes to obtain edited images;

a grid creator configured to cooperate with the ROI remover to receive the edited images and further configured to create grids over the edited images;

a second comparator configured to cooperate with the ROI creator to receive the captured images with the bounding boxes and with the grid creator to receive the edited images having the grids, and further configured to compare the received captured images and the edited images to identify undetected products and filter the recognized products from the edited images;

a product recognizer configured to cooperate with the second comparator to recognize the undetected products with the help of colour histogram technique, the product recognizer further configured to create regions of interest around the recognized undetected products and fit a bounding box around each of the created regions of interest to obtain second images;

an ROI identifier configured to cooperate with the ROI creator and the product recognizer to receive the first images and the second images having bounding boxes and further configured to combine the received images to identify matching regions of interest corresponding to matching products in the received images; and a counter configured to cooperate with the ROI identifier to count number of bounding boxes corresponding to matching regions of interests to obtain product counts for particular products.

4. The system as claimed in claim 1, wherein the system is configured to detect the out of stock situations and misplaced products based on planogram of the enclosed environment.

5. The system as claimed in claim 1, wherein the system is configured to recognize and count products having different orientations in an image.

6. The system as claimed in claim 1, wherein the first comparator is configured to use nearest neighborhood search to match the valid identified descriptors in the captured images against the descriptors in the stored k-d tree to obtain matching descriptors.

7. The system as claimed in claim 3, wherein the ROI creator is configured to fit the bounding box using techniques including Speeded Up Robust Features (SURF) correspondence, random sample consensus techniques and homography.

8. The system as claimed in claim 1, wherein the product counter is configured to discard incorrect maximum repeatability computation by fine tuning a distance threshold between the descriptors.

9. A computer implemented method for recognizing and counting stock for detecting out of stock situations and misplaced products by directly recognizing and counting the products from captured images within a defined environment comprising an area of shelves and aisles between the shelves, the shelves adapted to removably hold the stock comprising clusters of products, the method comprising:

storing in a intransient repository, a set of rules for: (i) store descriptors from a plurality of pre-determined product templates using a k-d tree; (ii) identifying descriptors in the captured images; (iii) comparing the descriptors in the k-d tree with the identified descriptors; and (iv) comparing number of descriptors with a first threshold value and a second threshold value, further storing in the intransient repository, a look-up table containing the plurality of pre-determined product templates corresponding to the products having pre-determined descriptors, the first threshold value and the second threshold value;

using the stored set of rules and generating a set of commands based on the set of rules for storing the k-d tree with descriptors in the intransient repository;

capturing a plurality of images of the clusters of products with the help of at least one image capturing device associated with at least one monitoring device moving between the aisles;

using the generated set of commands for identifying descriptors in the captured images and storing the identified descriptors in a transient repository, wherein the descriptors are pre-determined interest point features in the captured images;

using the generated set of commands for comparing number of the identified descriptors stored in the transient repository with the stored first threshold value to obtain valid identified descriptors;

using the generated set of commands for obtaining matching descriptors by comparing the valid identified descriptors with the descriptors in the stored k-d tree;

using the generated set of commands for comparing number of the matching descriptors with the stored second threshold value to obtain suitable descriptors;

identifying the plurality of product templates corresponding to the suitable descriptors from the stored look-up table;

recognizing products within the captured images from the stored look-up table based on the identified product templates; and using the generated set of commands for counting products based on the number of recognized products within the captured images, wherein counting number of recognized products within the captured images comprises receiving images of products having descriptors and computing maximum repeatability of particular descriptors within the received images to count number of times the particular descriptors are repeated in order to obtain product count within the received images.

10. The method as claimed in claim 9, wherein capturing the plurality of images of the clusters of products comprises capturing images of the clusters of products placed on the shelves with the help of a monocular camera.

11. The method as claimed in claim 9, wherein counting the products within the captured images comprises:

receiving the captured images with the recognized products;

creating regions of interest around the recognized products in the received captured images and fitting a bounding box around each of the created regions of interest to obtain first images;

removing sections of images corresponding to the recognized products that are fitted with bounding boxes to obtain edited images;

creating grids over the edited images;

comparing the received captured images and the edited images to identify undetected products and filtering the recognized products from the edited images;

recognizing the undetected products with the help of colour histogram technique;

creating regions of interest around the recognized undetected products and fitting a bounding box around each of the created regions of interest to obtain second images;

receiving the first images and the second images having bounding boxes and combining the received images to identify matching regions of interest corresponding to matching products in the received images; and counting number of bounding boxes corresponding to matching regions of interests to obtain product counts for particular products.

12. The method as claimed in claim 9, wherein the method comprises detecting the out of stock situations and misplaced products based on a planogram of the enclosed environment.

13. The method as claimed in claim 9, wherein the method comprises recognizing and counting products having different orientations in an image.

14. The method as claimed in claim 9, wherein the method includes using nearest neighborhood search to match the valid identified descriptors in the captured images against the descriptors in the stored k-d tree to obtain matching descriptors.

15. The method as claimed in claim 11, wherein the bounding box is fitted using techniques including Speeded Up Robust Features (SURF) correspondence, random sample consensus techniques and homography.

16. The method as claimed in claim 9, wherein computing maximum repeatability to obtain product count within the received images includes discarding incorrect computation by fine tuning a distance threshold between the descriptors.

* * * * *